US011739248B2

(12) United States Patent
Koster

(10) Patent No.: US 11,739,248 B2
(45) Date of Patent: Aug. 29, 2023

(54) TEMPORARY BLOCKAGE OF FLUID BOUNDARY BETWEEN HIGHER AND LOWER FLUID CONDUCTIVITY FORMATIONS

(71) Applicant: DPIP, LLC, Ellisville, MO (US)

(72) Inventor: Nick Koster, Ellisville, MO (US)

(73) Assignee: DPIP, LLC, Ellisville, MO (US)

( * ) Notice: Subject to any disclaimer, the term of this patent is extended or adjusted under 35 U.S.C. 154(b) by 0 days.

(21) Appl. No.: 17/270,682

(22) PCT Filed: Aug. 26, 2019

(86) PCT No.: PCT/US2019/048130
§ 371 (c)(1),
(2) Date: Feb. 23, 2021

(87) PCT Pub. No.: WO2020/041790
PCT Pub. Date: Feb. 27, 2020

(65) Prior Publication Data
US 2021/0340426 A1    Nov. 4, 2021

Related U.S. Application Data

(60) Provisional application No. 62/722,721, filed on Aug. 24, 2018.

(51) Int. Cl.
*C09K 8/516* (2006.01)
*C09K 8/502* (2006.01)
(Continued)

(52) U.S. Cl.
CPC .............. *C09K 8/502* (2013.01); *C09K 8/516* (2013.01); *C09K 8/565* (2013.01); *E21B 33/13* (2013.01);
(Continued)

(58) Field of Classification Search
None
See application file for complete search history.

(56) References Cited

U.S. PATENT DOCUMENTS 7,398,826 B2    7/2008  Hoefer et al.
7,935,662 B2    5/2011  Parlar et al.
(Continued)

FOREIGN PATENT DOCUMENTS

CN    107001922 A    8/2017
EP    3235890 A1    10/2017
(Continued)

OTHER PUBLICATIONS

PCT International Search Report and Written Opinion dated Dec. 26, 2019, for PCT Application No. PCT/US2019/048130, 11 pages.
(Continued)

*Primary Examiner* — Andrew Sue-Ako
(74) *Attorney, Agent, or Firm* — Dorsey & Whitney LLP

(57) ABSTRACT

Disclosed herein are compositions, processes, and systems for deploying and creating a temporary fluid barrier at an interface between a high fluid conductivity zone and a lower fluid conductivity zone. The disclosed compositions include mixtures of solvents and biodegradable non-spherical particles, wherein the particles include a coating that may slow or inhibit degradation, for example by hydrolysis, of the particle. The disclosed particles are designed to possess sufficient flexibility to traverse the high conductivity zone.

16 Claims, 15 Drawing Sheets

(51) Int. Cl.
  *C09K 8/565* (2006.01)
  *E21B 33/13* (2006.01)
  *E21B 37/06* (2006.01)
  *E21B 37/08* (2006.01)
  *E21B 47/06* (2012.01)

(52) U.S. Cl.
  CPC .............. *E21B 37/06* (2013.01); *E21B 37/08* (2013.01); *E21B 47/06* (2013.01)

(56) References Cited

U.S. PATENT DOCUMENTS

| | | | |
|---|---|---|---|
| 7,998,908 B2 | 8/2011 | Rimassa et al. | |
| 8,127,831 B2 | 3/2012 | Haeberle et al. | |
| 8,857,515 B2 | 10/2014 | Weaver | |
| 2003/0060374 A1* | 3/2003 | Cooke, Jr. ............... | E21B 43/26 507/200 |
| 2006/0151171 A1 | 7/2006 | Davies et al. | |
| 2011/0284245 A1* | 11/2011 | Crandall ............... | C09K 8/5751 507/119 |
| 2014/0060831 A1* | 3/2014 | Miller ................... | E21B 43/267 166/280.1 |
| 2017/0327727 A1* | 11/2017 | Dreyer ..................... | C09K 8/68 |
| 2018/0086961 A1* | 3/2018 | Weaver ................. | C09K 8/605 |

FOREIGN PATENT DOCUMENTS

| | | |
|---|---|---|
| WO | 2016056934 A1 | 4/2016 |
| WO | 2017182296 A1 | 10/2017 |

OTHER PUBLICATIONS

Polymer Database, "Poly(Vinylalcohol)," PolymerDatabase.com, 2017, polymerdatabase.com/polymers/polyvinylalcohol.html, 2 pages.
European Patent Office, "Extended European Search Report," dated Apr. 20, 2022, for European Application No. 19852054.6, 12 pages.

* cited by examiner

ELC18-052

TEMPORARY BLOCKAGE OF FLUID BOUNDARY BETWEEN HIGHER AND LOWER FLUID CONDUCTIVITY FORMATIONS

CROSS-REFERENCE TO RELATED APPLICATIONS

This application is a national stage application under 35 U.S.C. § 371 of International Application No. PCT/US2019/048130, filed Aug. 26, 2019, entitled "Temporary Blockage of Fluid Boundary Between Higher and Lower Fluid Conductivity Formations," which claims the benefit of priority pursuant to 35 U.S.C. § 119(e) of U.S. provisional patent application No. 62/722,721 entitled "Temporary Blockage Of Fluid Boundary Between Higher And Lower Fluid Conductivity Formations," filed on Aug. 24, 2018, which are hereby incorporated by reference in their entirety.

FIELD

The disclosed compositions, processes, methods, and systems are directed to temporarily blocking boundaries between higher and lower fluid conductivity zones in a well bore.

BACKGROUND

Wellbores of various types (for example oil and gas, geothermal, and water production and disposal) may be susceptible to build up of compounds found in certain geologic formations. For example, asphaltene molecules are found in many hydrocarbon formations and may precipitate out of the production flow at certain pressures and/or temperatures, and buildup of those asphaltenes can clog perforations, tubulars, and pipelines, and form deposits on various other surfaces. In other cases, clogging may be the result of deposition of various compounds such as calcium carbonate, iron sulfide, scale compounds, etc.

Removal of contaminating compounds and deposits may be facilitated by mechanical or chemical treatments. For example, buildup of asphaltenes and other contaminants and deposits is often treated by injecting one or more solvents or inhibitors into the wellbore. In the case of asphaltenes, solvent treatment may aid in converting precipitated compounds into nanoparticles or single molecules that may be removed with the production flow. As with other fluids, when chemical treatments, especially solvents, are deployed into geologic formations having sufficient fluid conductivity, the treatment chemical may leach away from the wellbore, lowering the effectiveness of the treatment.

Preventing the treatment chemicals from leaching away from the wellbore, for example by deploying a barrier layer, may help distribute the solvents across the treatment area, zone, or formation, but can reduce the ability of hydrocarbons in the formation from flowing into the wellbore for transit to the surface after the treatment.

What is needed is a way to temporarily prevent loss of solvent from the wellbore during certain treatments, so that conduction from the formation may be restored after contaminating compounds have been removed.

SUMMARY

Disclosed herein are compositions, methods, and systems for creating a temporary barrier to fluid flow at the boundary between a low conductivity area, zone, or formation, and a higher conductivity area, for example a gravel pack in a production well. In many embodiments, the composition may comprise non-uniform biodegradable particles designed to traverse the high conductivity area and create a barrier at the boundary with a lower conductivity area. In many embodiments, the biodegradable particles may have at least a first dimension greater than about 5 µm and a second dimension that is 2× or greater than the first dimension. In many embodiments, the first dimension is a diameter, which may be between about 5 µm and 20,000 µm and exhibit sufficient elasticity to bend and deform as needed to traverse the high conductivity zone. In most embodiments, sufficient elasticity may be a Young's modulus of less than about 500 k psi (pounds per square inch), as determined by testing under standard protocols, for example ASTM E2769.

The biodegradable particle may be comprised of a polymer that may degrade or hydrolyze in a solvent. The solvent may be selected from water, hexane, toluene, benzene, xylene, and combinations thereof. In many embodiments, the particles may have a density that is similar to that of the solvent that may be used to deploy the particle. In many embodiments, the polymeric biodegradable particle may be coated with a coating material that may slow or inhibit degradation by the solvent. In some embodiments, the coating may be a chemical or compound deposited on the surface of the particle. In some embodiments, the compound is silica.

Disclosed herein are methods, processes, and systems useful in creating a temporary fluid barrier between a high conductivity zone and low conductivity formation. In some embodiments the methods and processes may be used in oil and gas production, such as were the fluid being produced has an amount of asphaltene content. In many embodiments, the disclosed method may include the steps of combining a biodegradable polymeric particle in a solvent, wherein the density of the particle is similar to that of the solvent, allowing the particle to mix with the solvent to create a mixture, depositing the mixture in a volume having high fluid conductivity, allowing the particles to traverse the high fluid conductivity area to a lower fluid conductivity area; depositing the particles at the interface of the high conductivity area and the lower conductivity area; creating a degradable barrier at the interface to inhibit the solvent from entering the lower conductivity area.µ

DETAILED DESCRIPTION

Figure 1:
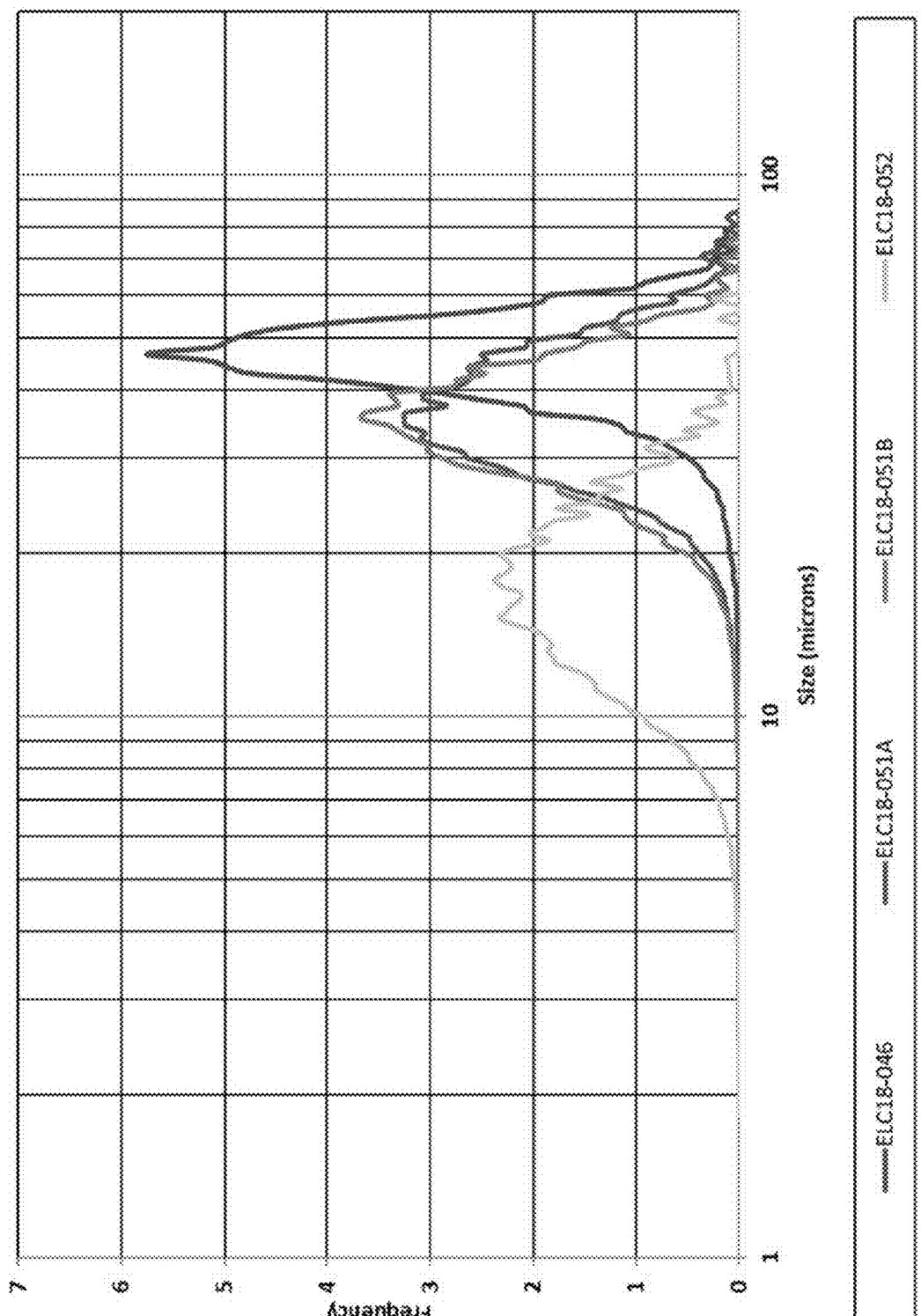
FIG. 1 shows a graph of the volume distribution of the disclosed particles.
Figure 2:
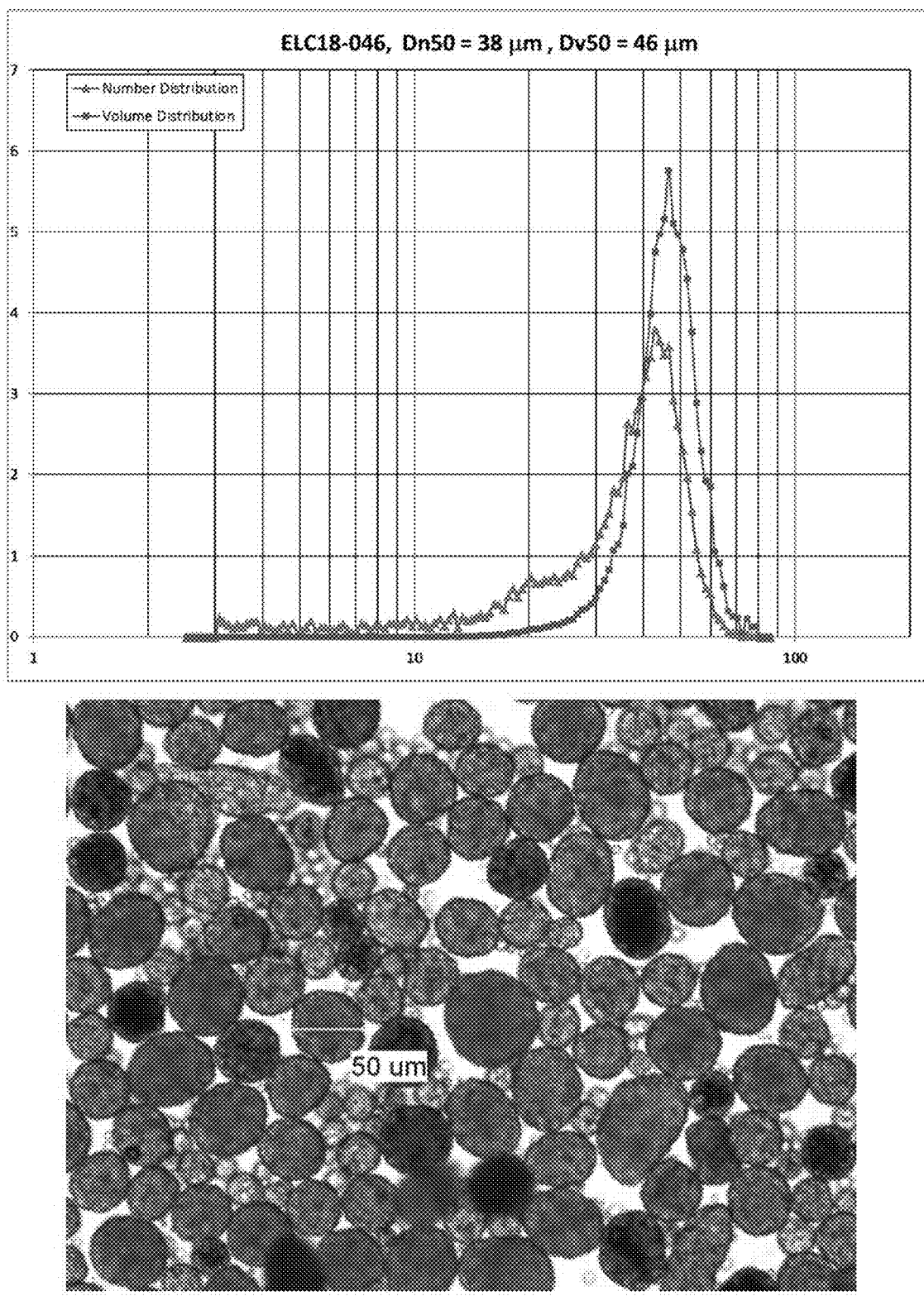
FIG. 2 shows data for ELC18-046. At top is graph of size distribution (frequency vs. microns) and at bottom is a micrograph of the particles.
Figure 3:
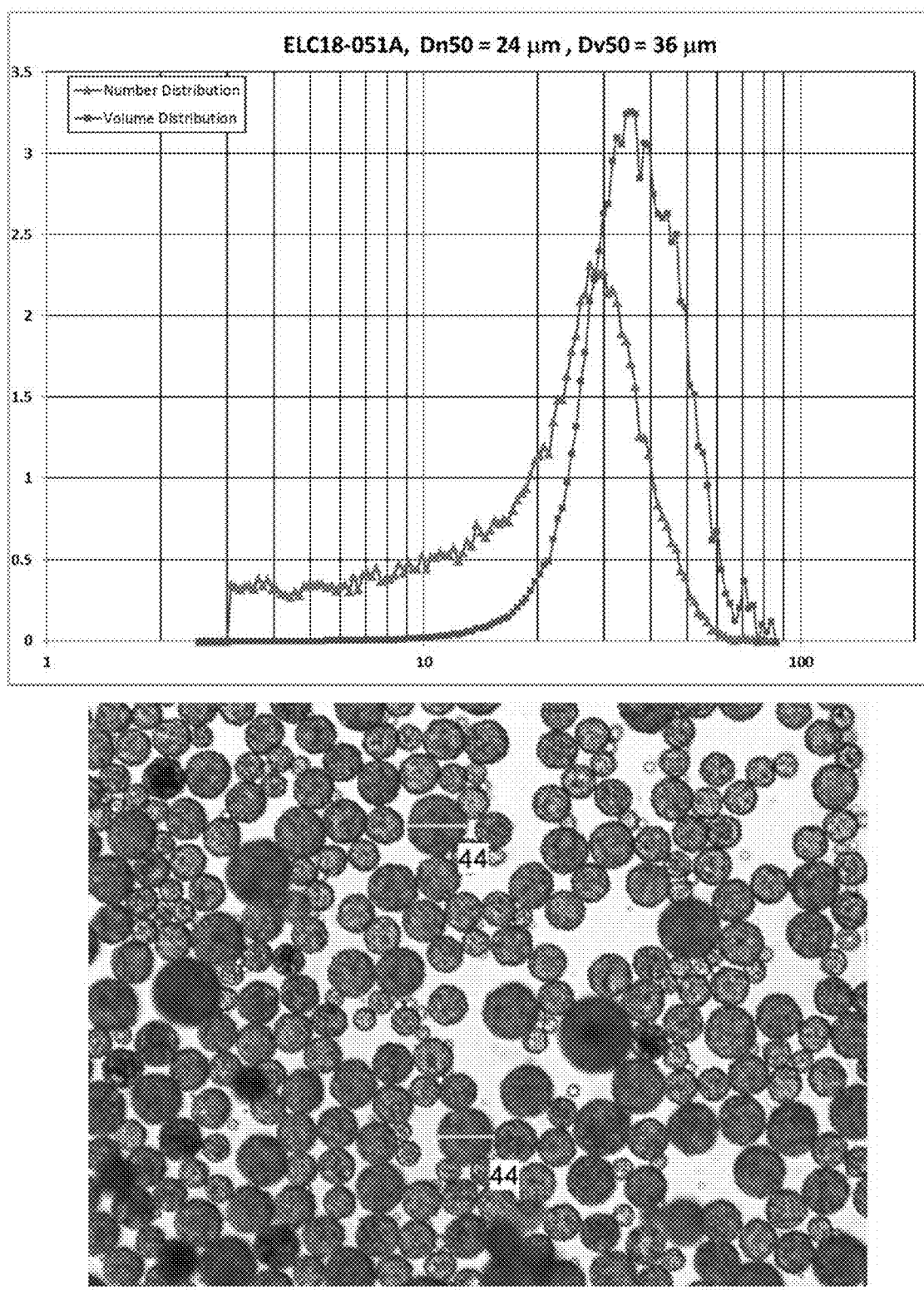
FIG. 3 shows data for ELC18-051A. At top is graph of size distribution (frequency vs. microns) and at bottom is a micrograph of the particles.
Figure 4:
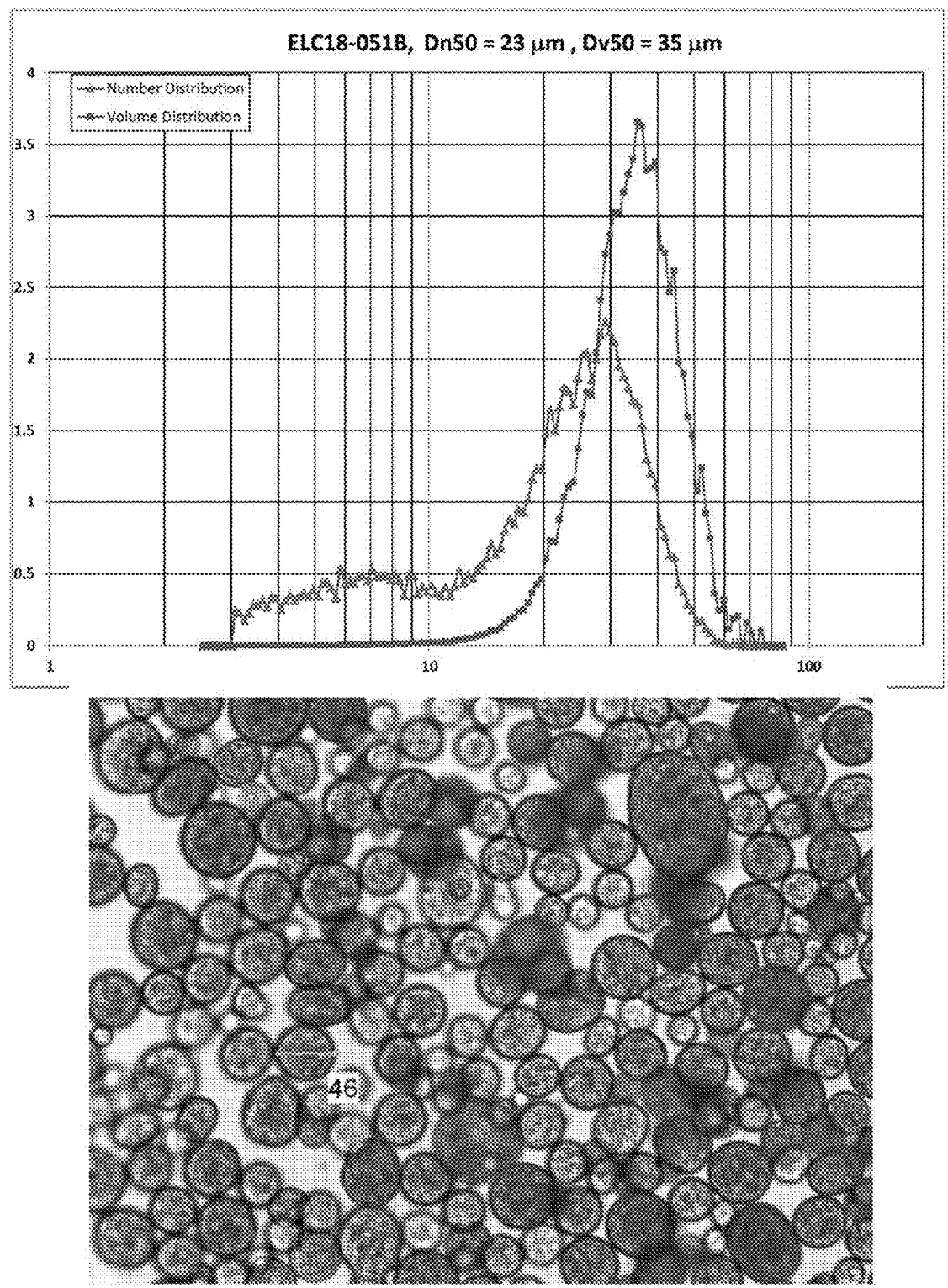
FIG. 4 shows data for ELC18-051B. At top is graph of size distribution (frequency vs. microns) and at bottom is a micrograph of the particles.
Figure 5:
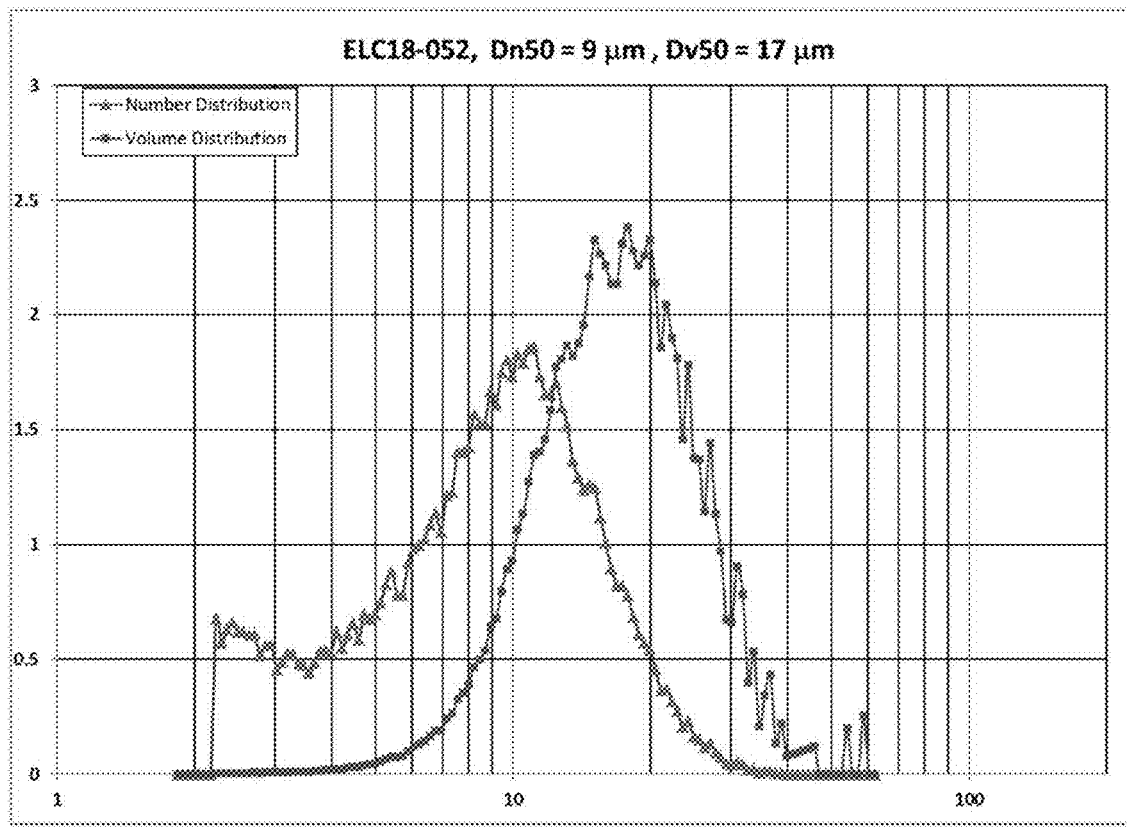
FIG. 5 shows data for ELC18-052. At top is graph of size distribution (frequency vs. microns) and at bottom is a micrograph of the particles.
Figure 5:
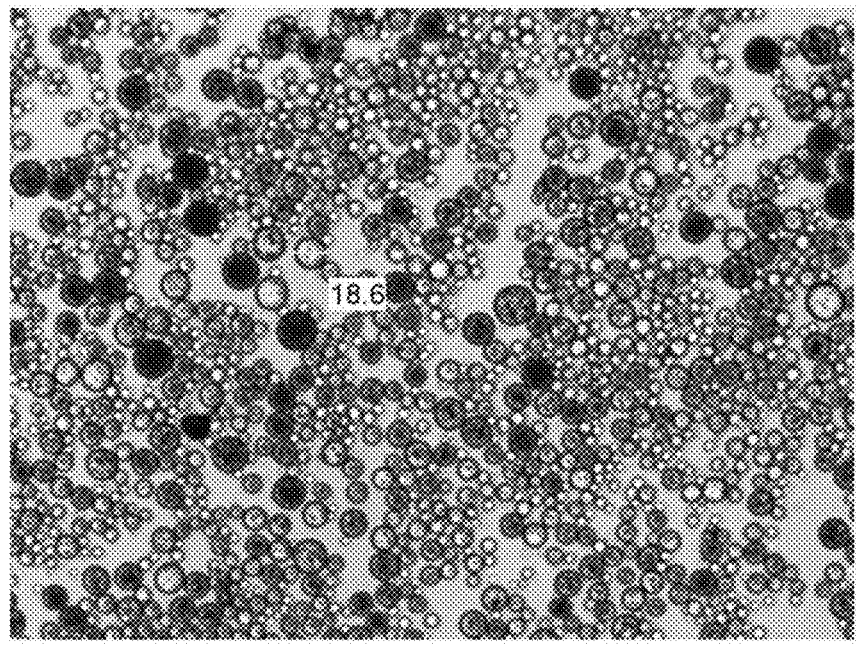

Disclosed herein are compositions, methods, and systems useful in creating a temporary fluid barrier between a first and second conductivity zone, wherein the fluid barrier comprises a plurality of biodegradable particles having a coating that can be removed by at least one component of a solvent over time. The fluid barrier allows the solvent to act on one or more contaminating compounds that may be inhibiting or reducing the flow of a fluid through a borehole.

Particles

The disclosed particles are biodegradable porous polymeric particles. In most embodiments, the particles may dissolve or hydrolyze when exposed to a solvent, for example water. The particles may have internal pores that reduce their density to be similar to that of a given solvent. For example the disclosed particles may have an internal porosity between about 0% and 20% of the particle's volume. In a preferred embodiment, the particle's internal porosity may be greater than about 10%. In some embodiments, the particles may have a density between about 0.8 and 1.5 g/cm. For example the density of the particle may be greater than about 0.80 g/cm, 0.9 g/cm, 0.95 g/cm, 1.0 g/cm, 1.05 g/cm, 1.1 g/cm, 1.15 g/cm, 1.2 g/cm, 1.25 g/cm, 1.3 g/cm, 1.35 g/cm, 1.4 g/cm, or 1.45 g/cm and less than about 1.5 g/cm, 1.45 g/cm, 1.4 g/cm, 1.35 g/cm, 1.3 g/cm, 1.25 g/cm, 1.2 g/cm, 1.15 g/cm, 1.1 g/cm, 1.05 g/cm, 1.0 g/cm, 0.95 g/cm, 0.9 g/cm, 0.85 g/cm, or 0.8 g/cm. In some preferred embodiments, the particle's density may match the density of a solvent into which the particle is combined, for example ±20% of the solvent's density.

The disclosed particles may be manufactured from a variety of types of polymer. For example, suitable polymers may be derived from vinyl monomers, such as styrene and acrylic monomers. Various resins may be used to create the disclosed particles, for example homo- and copolymers, for example styrene, chlorostyrene, ethylene, propylene, butylene, isoprene, vinyl acetate, vinyl propionate, vinyl benzoate, and vinyl butyrate, methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate, vinyl methyl ether, vinyl ethyl ether, and vinyl butyl ether, vinyl methyl ketone, vinyl hexyl ketone, vinyl isopropenyl ketone and combinations thereof.

In most embodiments, the particles may comprise biocompatible or biodegradable polymers, for example polycaprolactone (PCL), Poly (lactic-co-glycolic acid) (PLGA), and poly-lactic acid (PLA) are particularly useful.

The disclosed particle may be coated with a coating material that is less soluble than the material of the particle. In many embodiments, the coating material may be any compound or combination of compounds that may be dissolved by the solvent. In some embodiments, the coating material may polymeric or molecular. In one particular embodiment the coating is a silica-based compound. In some embodiments, the coating may be a colloidal silica, for example colloidal silica oxide. In many embodiments, the particle may have a coating weight that is 0.01-5% of the entire weight of the particle, for example greater than about 0.01%, 0.05%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, or 4.9%, and less than about 5.0%, 4.9%, 4.8%, 4.7%, 4.6%, 4.5%, 4.4%, 4.3%, 4.2%, 4.1%, 4.0%, 3.9%, 3.8%, 3.7%, 3.6%, 3.5%, 3.4%, 3.3%, 3.2%, 3.1%, 3.0%, 2.9%, 2.8%, 2.7%, 2.6%, 2.5%, 2.4%, 2.3%, 2.2%, 2.1%, 2.0%, 1.9%, 1.8%, 1.7%, 1.6%, 1.5%, 1.4%, 1.3%, 1.2%, 1.1%, 1.0%, 0.9%, 0.8%, 0.7%, 0.6%, 0.5%, 0.4%, 0.3%, 0.2%, 0.1%, 0.05%, 0.04%, 0.03%, or 0.02%. In some embodiments, the coating is between 0.1 and 3% w/w or between about 0.01 and 0.5% of the entire particle.

The particles may have any shape that may allow them to traverse through a high fluid conductivity area and be at least partially prevented from traversing a lower conductivity area. In most embodiments, the particles have a first measurable dimension of greater than about 1.0 μm, 2.0 μm, 3.0 μm, 4.0 μm, 5.0 μm, 6.0 μm, 7.0 μm, 8.0 μm, 9.0 μm, 10.0 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 110 μm, 120 μm, 130 μm, 140 μm, 150 μm, 160 μm, 170 μm, 180 μm, 190 μm, 200 μm, 250 μm, 300 μm, 350 μm, 400 μm, 500 μm, 600 μm, 700 μm, 800 μm, 900 μm, 1000 μm, 1500 μm, 2000 μm, 2500 μm, or 2750 μm, and less than about 3000 μm, 2750 μm, 2500 μm, 2000 μm, 1500 μm, 1250 μm, 1000 μm, 900 μm, 800 μm, 700 μm, 600 μm, 500 μm, 400 μm, 300 μm, 200 μm, 190 μm, 180 μm, 170 μm, 160 μm, 150 μm, 140 μm, 130 μm, 120 μm, 110 μm, 100 μm, 90 μm, 85 μm, 80 μm, 75 μm, 70 μm, 65 μm, 60 μm, 55 μm, 50 μm, 45 μm, 40 μm, 35 μm, 30 μm, 20 μm, 10 μm, 9.0 μm, 8.0 μm, 7.0 μm, 6.0 μm, 5.0 μm, 4.0 μm, 3.0 μm, 2.0 μm, or 1.0 μm. For example between 2 and 3000 μm, such as between 2 and 300 μm.

The size may be generally described in terms of Dv50 or Dn50. In many embodiments, the first measurable dimension is a diameter, and a second measurable dimension is a length, measured generally normal to a plane defined by the diameter. In most embodiments, the second measurable dimension is at least 1.5× the first measurable dimension, and less than about 50×. In most embodiments, the second measurable dimension is between about 1.5× and 20× the first measurable dimension. In many embodiments, the shape may be generally oblong, oval, or spherical.

The particles may retain their shape, size, and integrity during exposure to one or more solvents. In many embodiments, maintenance of these characteristics is greater than about 60%, 65%, 70%, 75%, 80%, 85%, 90%, or 95%, and less than about 100%, 95%, 90%, 85%, 80%, 75%, 70%, or 65%. While temperature may affect maintenance of integrity, most particles will maintain the above levels of integrity for more than 15 min, 20 min, 25 min, 30 min, 35 min, 40 min, 45 min, 50 min, 55 min, 1 hr, 1.5 hr, 2 hr, 3 hr, 4 hr, 5 hr, 6 hr, 7 hr, 8 hr, 9 hr, 10 hr, 15 hr, 20 hr, 24 hr, 48 hr, 72 hr, or more, at temperatures between about 100 and 350° F., for example greater than about 100° F., 110° F., 120° F., 130° F., 140° F., 150° F., 160° F., 170° F., 180° F., 190° F., 200° F., 2200° F., 2400° F., 2600° F., 280° F., 290° F., 300° F., 320° F., 340° F., or 350° F., and less than about 350° F., 340° F., 320° F., 300° F., 290° F., 280° F., 270° F., 260° F., 250° F., 240° F., 230° F., 220° F., 210° F., 200° F., 190° F., 180° F., 170° F., 160° F., 150° F., 140° F., 130° F., 120° F., or 110° F.

The disclosed particles are sufficiently elastic to traverse a particulate pack (gravel pack) and or sand screen of a given pore size. In many embodiments, the gravel pack is comprised of particles with sizes between 20 and 40 mesh, and the disclosed particles are sufficiently elastic to traverse the voids between the particles. In many embodiments, the particulate size of the gravel pack is between about 8 mesh and 70 mesh, for example greater than about 8, 10, 12, 14, 16, 18, 20, 25, 30, 35, 40, 45, 50, 55, 60, 65 or 70 mesh, and less than about 75, 65, 60, 55, 50, 45, 40, 35, 30, 25, 20, 18, 16, 14, 12, 10, or 8 mesh. In many embodiments that Young's modulus of the polymer is less than about 500 k psi, as measured using ASTM protocol E2769.

Solvents

Various types of solvents are useful in the presently disclosed compositions and methods. In most embodiments, the solvents are organic solvents able to dissolve one or more of the polymers used to create the particle, asphaltenes, and combinations thereof. In various embodiments, the solvent may be selected from dimethyl carbonate, diethyl carbonate, benzene, xylene, o-xylene, p-xylene, hexane, naphtha, toluene, cyclohexanone, N-2-methyl pyrrolidone, N-ethyl-2-pyrrolidone, water, and combinations thereof.

The solvent density may be varied to be similar to that of the particle. In many embodiments, the density of the solvent is less than about ±20% different than the density of the particle. The density of the particle may be referred to as Dp, and the density of the solvent may be referred to as Ds, and the ratio of Dp:Ds may be between about 1:0.8 to about 1:1.2. In many embodiments, the ration of Dp:Ds is about 1.00:0.95-1.05.

Asphaltenes

Asphaltenes are heterocyclic unsaturated macromolecules consisting primarily of carbon and hydrogen. In some cases, the asphaltenes may include other elements such as sulfur, oxygen, nitrogen, and metals. Asphaltenes are found in crude oil and are generally at the higher end of oil's molecular-weight components. Generally, asphaltenes are single molecules, but as crude oil is mixed with production compounds and brought to the surface, the asphaltenes may leave the crude oil and deposit on various surfaces and/or create particles.

Asphaltene deposition can occur in various places, such as the near-wellbore region, perforations, in the tubing, downhole surface chokes, surface flowlines, gravel packs, and other equipment used to produce and process the oil. Asphaltene deposition may, in some cases, significantly affect a well's productivity.

Sand Control Completion—Gravel Pack, Sand Screen

Sand control completions (SCC) are used in oil and gas development, completion, and production to reduce particulate matter in the production flow and/or to stabilize a formation. Typically, the sand control completion is selected from a sand screen and a gravel pack. For example the gravel pack may involve placing a screen in the wellbore adjacent the interval undergoing completion. Gravel is introduced and held in place by the screen. The gravel pack is designed to form a permeable mass that allows flow of the produced fluids through the gravel while trapping particulates like sand. As disclosed above, the SCC may be various sizes.

Gravel packs and their interface with the producing formation may become clogged with asphaltenes and other compounds that reduce production flow. To remove these compounds, a solvent may be used to wash the gravel pack, solubilizing or dissolving the compound buildup. Leaching of the solvents out of the gravel pack area reduces the effectiveness of this process, but placing a permanent barrier outside the gravel pack would reduce flow of production fluids. Applicants have found that a temporary barrier of particles that are sized to traverse the gravel pack can increase the effectiveness of the solvent treatment without disrupting production flow after the treatment is complete.

Conductivity Area

The disclosed compositions and methods are designed to traverse a high fluid conductivity area but be impeded by an adjacent lower conductivity area. In many embodiments, a plurality of impeded particles will create a barrier to fluid flow into the lower conductivity area. The position of the barrier may be referred to as an interface or boundary between the high fluid conductivity area and the lower fluid conductivity area.

The high fluid conductivity area may be found in a variety of industry and technological applications. In most embodiments the application is mining, agricultural, geologic exploration. For example, the application may be a wellbore for oil and gas production, geothermal, or water production or disposal. In various embodiments, the application may be a gravel pack in an oil and gas production well, and the lower conductivity area may be a producing formation adjacent the gravel pack.

The disclosed compositions and methods may be useful in cleaning sand control completion or SCC. In many embodiments, the SCC may be fouled or clogged with one or more contaminants. In these embodiments, a solvent may aid in reducing the amount of fouling, and partially or completely restoring flow though the SCC. In many embodiments, where flow through the SCC is not completely restored, a second solvent treatment may be needed. In these embodiments, deployment of the disclosed particles through the SCC may help to reduce solvent loss to surrounding formations. In many embodiments, a method of treating the SCC with a solvent alone or solvent with disclosed particles is useful in restoring flow through the SCC. In these embodiment, an operator may monitor the pressure of fluid in the well. After deployment of solvent, the pressure may drop as contamination of the SCC is reduced. The operator may then administer the disclosed particle in additional solvent, for example water and/or an organic solvent selected from one or more of xylene, toluene, and benzene. In these cases, the disclosed particle may traverse the SCC and help to fully or partially seal a formation with high conductivity, so that the solvent (or additional solvent injections) may help to continue to clean the SCC. Thus the disclosed method may include

EXAMPLES

Example 1—ECL18-046, -051, and -052

Several embodiments of the disclosed particles were produced and analyzed. Specifically, the particles size (in Dn and Dv) and melting temperature (Tg—glass transition temperature by differential scanning calorimetry, DSC) of four embodiments of the disclosed particles was analyzed. Particle size was measured using a Multisizer II (Coulter) at 140 micron aperture for Samples ELC18-046 and -051, and a 100 micron aperture for ELC18-052. Melting temperature was determined at second heating using differential scanning calorimetry. Micrographs of particles were taken at 200×. Table 1, below, summarizes the data from these experiments.

TABLE 1

| Sample | Particle Size (microns) | | | | | | Tg (Deg C.) | Ethyl Acetate (wt %) |
|---|---|---|---|---|---|---|---|---|
| | Dn10 | Dn50 | Dn90 | Dv10 | Dv50 | Dv90 | | |
| ELC18-046 | 14.3 | 38.2 | 51.0 | 35.0 | 46.1 | 57.1 | 47.4 | 1.0 |
| ELC18-051A | 6.0 | 24.0 | 38.6 | 24.8 | 36.1 | 51.8 | 46.0 | 1.2 |
| ELC18-051B | 6.0 | 22.9 | 37.1 | 23.4 | 34.7 | 48.0 | 42.3 | 1.9 |
| ELC18-052 | 3.2 | 9.1 | 16.6 | 10.0 | 16.9 | 27.5 | 46.7 | 0.8 |

FIG. 1 shows a graph of the volume distribution of the disclosed particles. FIGS. 2-5 show size distribution graph (top), in microns, and micrograph (bottom; shown are bar measuring one particle in field in yellow and the size in microns) for embodiments summarized in Table 1.

Example 2—ELC18-26 and ELC18-72 and -72W

Two additional embodiments of the disclosed particles were created and tested. ELC18-026 was made on a lab scale process for a particle in the 100 to 250 micron range. The batch was dry sieved through a 60 mesh (250 micron) screen. Sizing showed that particles were approximately 120 microns by volume (Dv50) and contained fines (smaller particles) under about 30 microns. Particle size testing was performed on a sample of the batch that had been additionally screened through an 80 mesh (177 micron) sieve. Thus, particle sizes greater than about 180 are not shown. Particle shapes were generally irregular—non-spherical.

ELC18-072 was made using a continuous process at the pilot scale. Half of the -072 batch, ELC18-072W, was treated/washed to remove colloidal silica coating the surface of the particle. Thus, the untreated particles, ELC18-072, should be easier to wet in water. In most cases, the colloidal silica coating acts as a flow aid to enhance pouring. -072W appeared fluffier, upon visual examination, and may have exposed polymer on the surface. Sizing demonstrated that both samples were similar in size. Particle shape is generally spherical or round. DSC analysis indicated that washing the disclosed particles reduced the melting peak (Tg) during the 1st heat. Without wishing to be confined by theory, this drop in melting may be due to loss of crystallinity.

Figure 6:
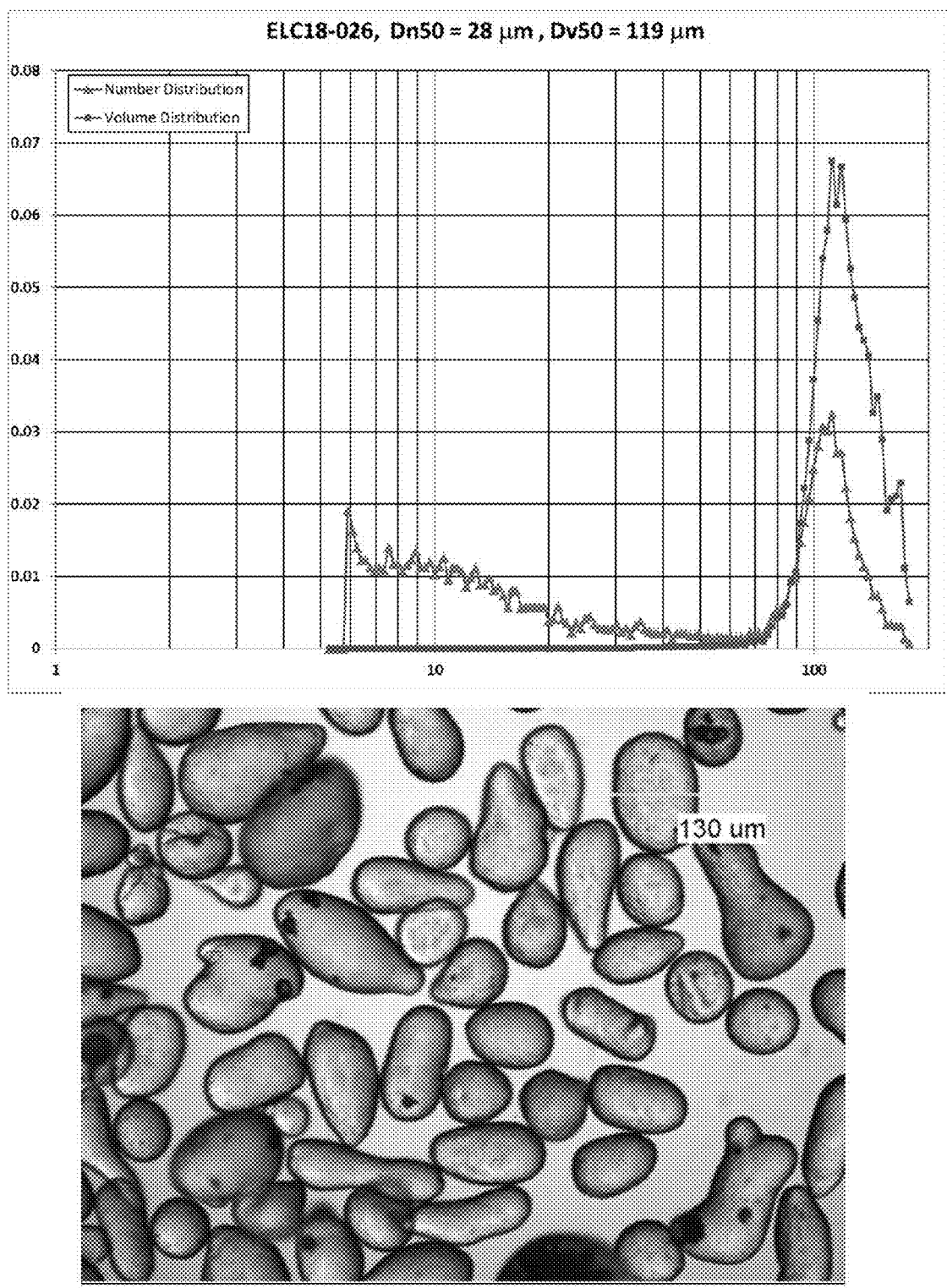
FIG. 6 shows data for ELC18-026. At top is graph of size distribution (frequency vs. microns), and at bottom is a micrograph of the particles.
Figure 7:
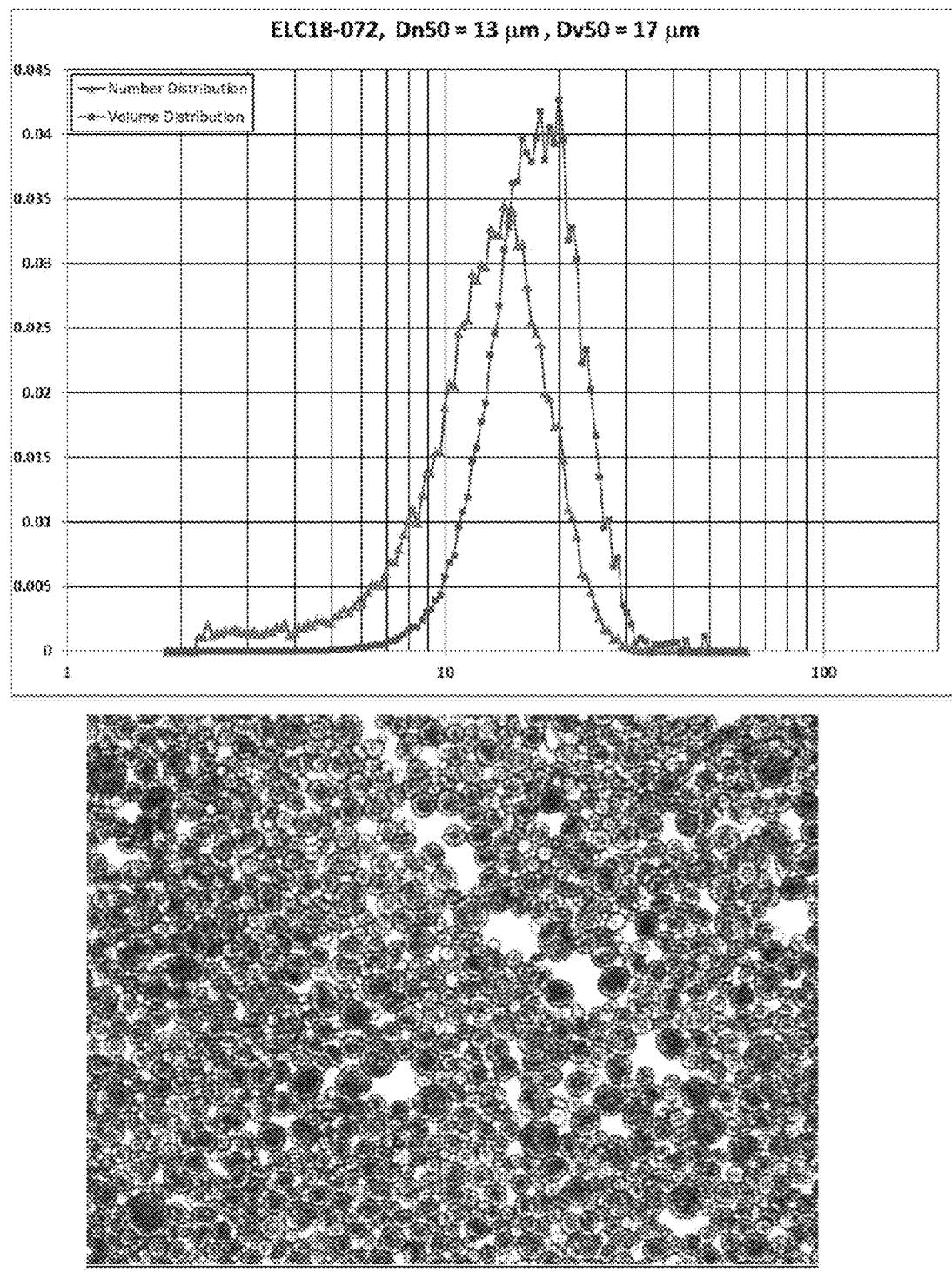
FIG. 7 shows data for ELC18-072. At top is graph of size distribution (frequency vs. microns), and at bottom is a micrograph of the particles.

Data is summarized below in Table 2. FIGS. 6 and 7 show data for ECL18-026 and -072, respectively. Top of figure shows sizing distribution, and bottom is micrograph, with magnification given below micrograph.

TABLE 2 data for embodiments ELC18-026 and -072.

| Sample | Particle Size (microns) | | | | | | Tg (Deg C.) | EA (wt %) | SiO2 (wt %) |
|---|---|---|---|---|---|---|---|---|---|
| | Dn10 | Dn50 | Dn90 | Dv10 | Dv50 | Dv90 | | | |
| ELC18-026 | 7.0 | 27.7 | 123.3 | 96.1 | 118.6 | 153.4 | | | |
| ELC18-072 | 6.9 | 13.1 | 19.4 | 12.0 | 17.4 | 23.9 | 46.7 | 1.4 | 4.56 |
| ELC18-072W | 6.6 | 12.9 | 19.0 | 11.8 | 17.0 | 23.5 | 48.1 | 1.4 | 0.45 |

Example 3—Xylene

Experiments were performed to analyze the disclosed particles' performance in a deployment fluid comprising 40% xylene, 40% toluene, 10% naptha, and 10% methanol. The test fluid for these experiments contained 50% xylene and 50% toluene. An upper limit for the particle size was selected to be about 150 microns. In many cases, particle shape was oblong with a Dv50 about 120 microns.

The disclosed particles were loaded into the test fluid in undiluted state at about 1.75% w/w and mixed. The ability of the particles to maintain shape, size, and integrity was examined for a minimum of 4 hours after addition of deployment fluid. Temperature at mixing was about 75-80° F. It was recognized that during this time, some agitation might occur.

While softening of the particle may be acceptable, in most cases the particles were designed to maintain their integrity. In one embodiment, integrity was measured by assessing the percent weight, from starting weight, retained by a given amount of particles. A 75% weight retention was desired. In most cases, the particles were designed to resist breakage when submitted to stressors, for example physical or atmospheric pressure.

In many embodiments, the disclosed particles may be subjected to temperatures of as great as 250° F., or more, down hole under static conditions. In some embodiments, those temperatures may increase from generally ambient temperature (70-90° F.) over a period of about 18 hours, or more. In many embodiments, the disclosed particles were designed to substantially or completely dissolve by about 24 hours. In some cases, conditions may be maintained or static for about 24-48 hours, or more.

In many embodiments, a deployment fluid, for example one containing the disclosed particles, may contact solutions comprising about 5% water and about 95% hydrocarbon after the 24 to 48 hour period—this may be referred to as the flowback period. In most embodiments, the disclosed particles are designed to be substantially or completely dissolved by this time, so that particle remnants (partially dissolved particles) do not flow back and/or solidify and/or clump during flowback.

Particle Manufacture

Listed in the table below are a number of different batches of the disclosed particles with various shapes, sizes (in Dv50) and melting temperatures. These particles (named with ELC18—nomenclature) were produced with median sizes (volume; Dv50) from about 50 to about 120 microns. Each batch of the disclosed particle was manufactures with different external coatings.

TABLE 3 name, size, melt temperature (Tg—glass transition temperature), and shape of various tested particles.

| Particle | Dv50 (micron) | Tg deg C. | Shape |
|---|---|---|---|
| ELC18-092 | 49.9 | 49.1 | round |
| ELC18-095 | 113 | 50.6 | oblong |
| ELC18-096 | 119.2 | 51.8 | oblong |
| ELC18-097 | 115.8 | 51.9 | oblong |
| ELC18-098 | 49.9 | 52.4 | oblong |
| ELC18-099 | 56.9 | 51.4 | oblong |
| ELC18-100 | 54 | 50.6 | round |
| ELC18-101 | 68.7 | 52.4 | oblong |
| ELC18-102 | 67.3 | 50.1 | oblong |
| ELC18-103 | 59.1 | 52.6 | round |

Figure 8:
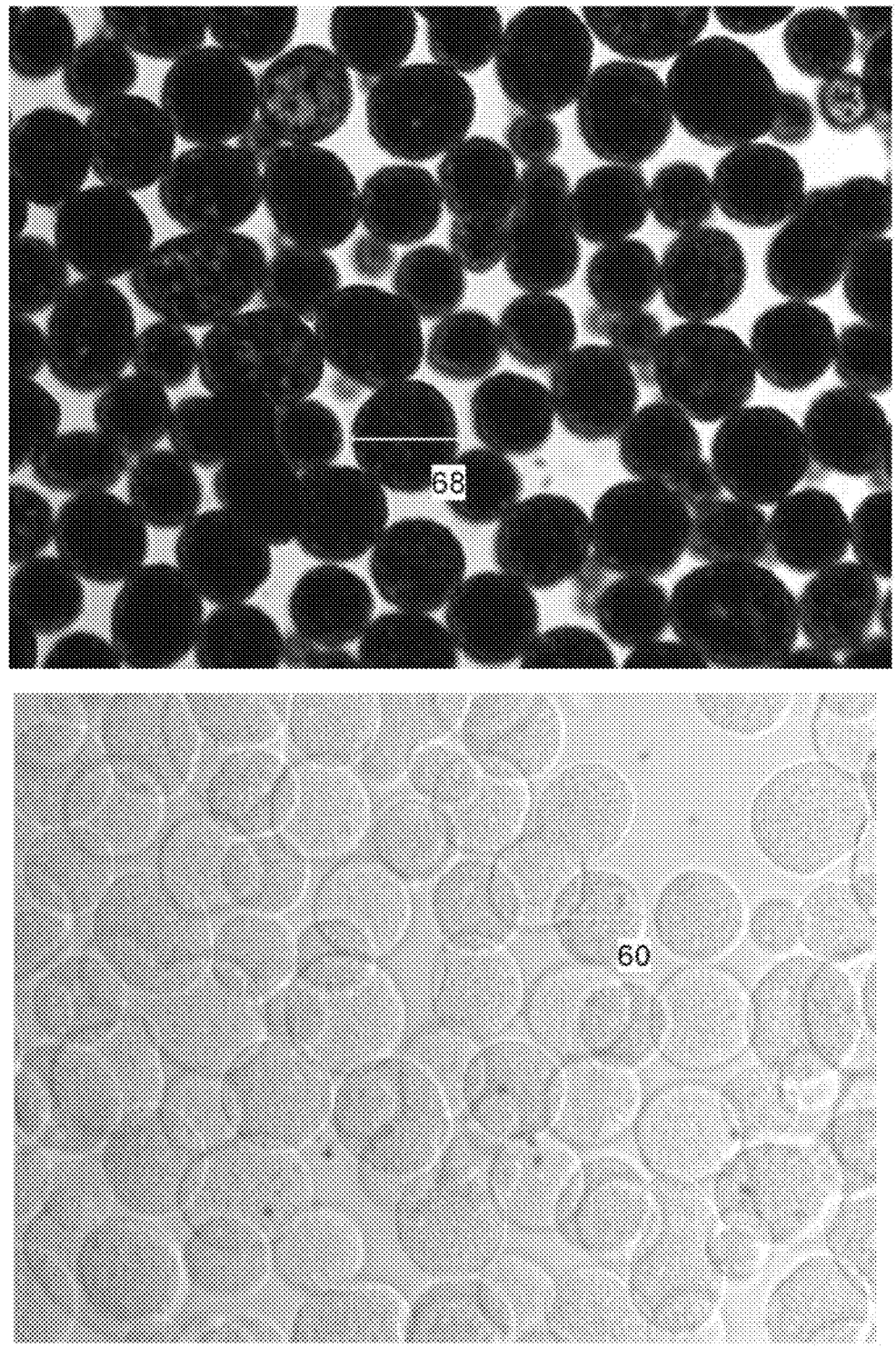
FIG. 8 are micrographs of one embodiment of the disclosed particles before (top) and after (bottom) exposure to solvents (diameter of selected particles shown in yellow, with size in microns).

The disclosed particles were placed in glass vials and rolled continuously about 16 hrs to mix the particles with the solutions. Glass vials were allowed to settle and any matter at bottom of the vial was tested for the presence of particles (visually by microscope examination). Typical shapes of particles are shown in FIG. 8. Specifically, FIG. 8 shows batch ELC18-103 before (top) and after mixing for 16 h at room temperature in xylene/toluene. This was typical of other spherical particles' appearances.

Figure 9:
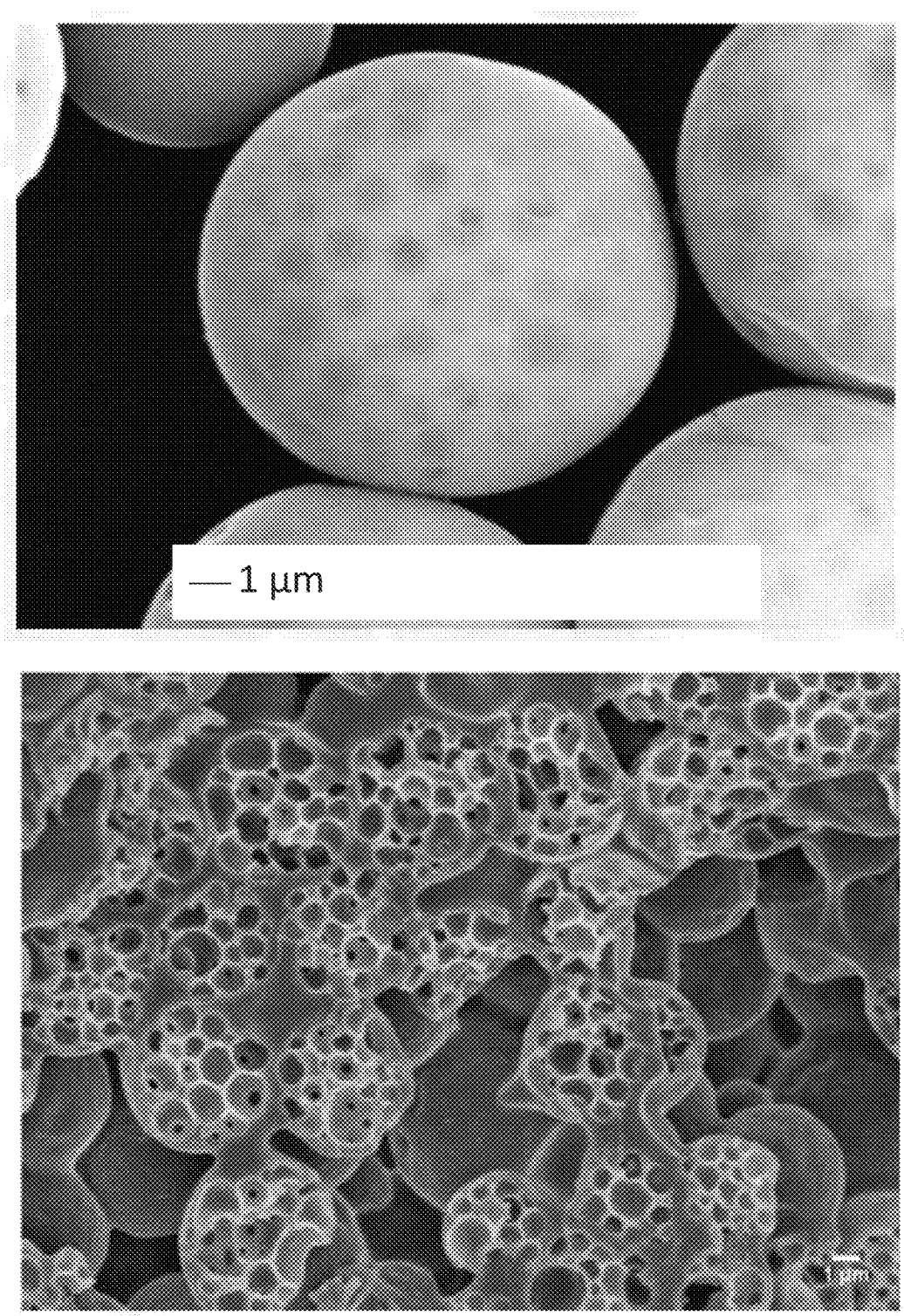
FIG. 9 is a high magnification surface micrograph of one embodiment of the disclosed particles (top) and a micrograph showing internal structures (bottom). 1 micron size bar shown.

These experiments demonstrated that the disclosed particles were resistant to degradation in solvents after about 16 hr. Clear nature of the particles, post exposure, suggests that, at least in some embodiments, internal structures (such as those seen in FIG. 9) may degrade in solvent. Alternatively, the internal structures may flood with solvent.

Particles were investigated after exposure to solvent to determine integrity of the disclosed particles. For these experiments, particles and solution from the vials were filtered through qualitative filter paper. Particles and filters were dried, and re-hydrated particles were assessed visually. Dried particles were placed in water with surfactant, sonicated, and inspected by microscope (FIG. 10; ELC18-103 after drying and rehydrating, top, and ELC18-100F after exposure to solvent+material). Figure then put back into water with surfactant added. Sample was sonicated and examined under microscope.

Particle integrity was also assed after exposure to solvent (4 hours with continuous rolling), by weighing particles trapped by filter and comparing to input weight. For these experiments, particles and solution from the vials were filtered through qualitative filter paper, dried, and the particles weighed. Table 4 shows the results of these experiments suggests that about 40% of the particles weight remains after 4 hours.

TABLE 4 percent particles (by weight) remaining after exposure to solvent for 4 h.

| Sample | % Remaining |
|---|---|
| ELC18-092 | 38.0 |
| ELC18-096 | 39.7 |
| ELC18-097 | 41.7 |
| ELC18-098 | 41.4 |
| ELC18-100 | 42.8 |
| ELC18-101 | 41.6 |
| ELC18-103 | 34.6 |

Batch ELC18-100 was selected for further testing, to investigate the ability of other materials to affect integrity. Specifically, six coating formulations were used, singly on the same batch of particles, in amounts of about 1% of particle mass. These results are shown below at Table 5.

Figure 10:
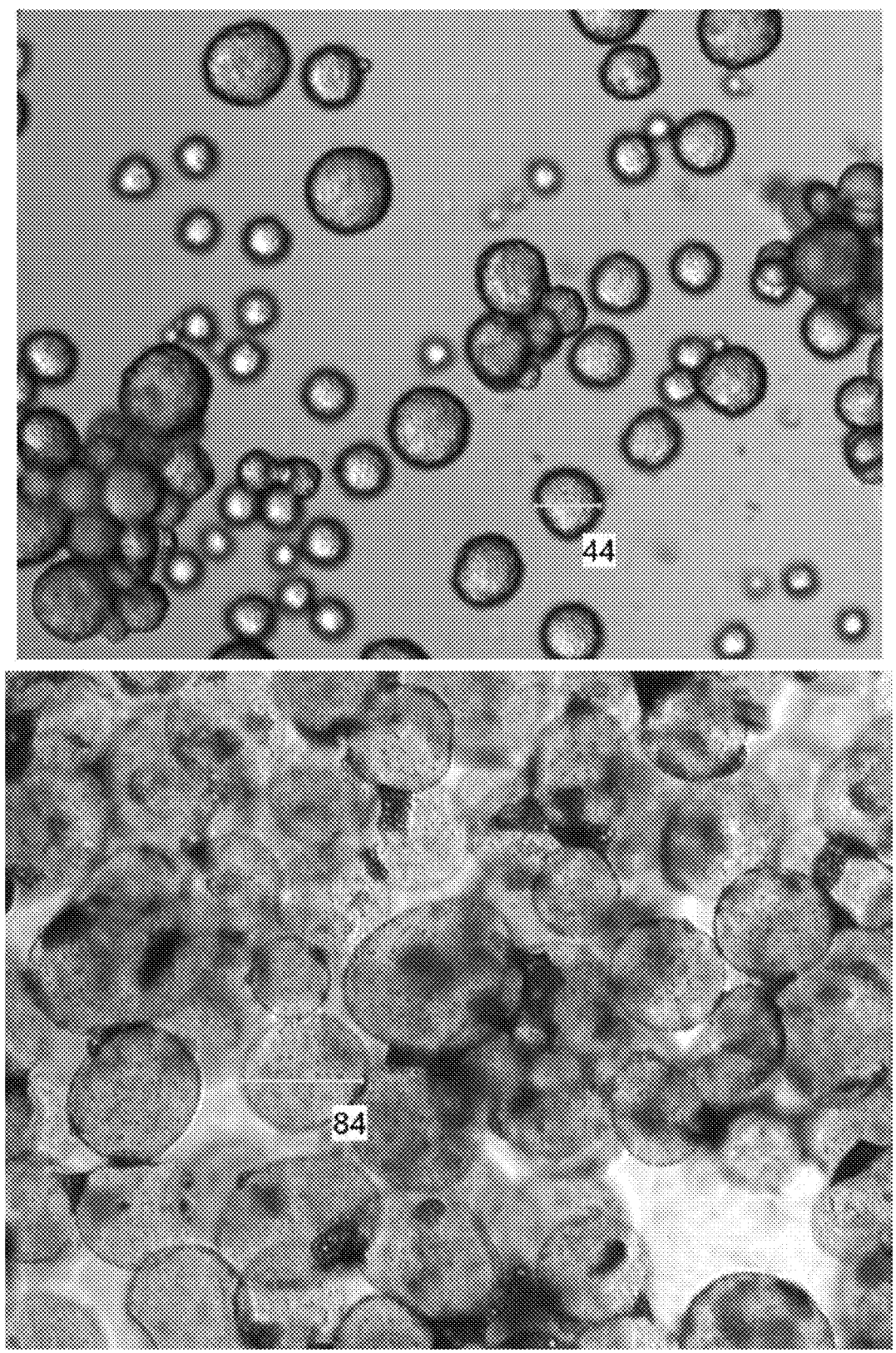
FIG. 10, at top is a micrograph of one embodiment of particles, ELC18-103, exposed to solvent, dried, and rehydrated in water/surfactant, and sonicated and viewed. At bottom is another embodiment of the disclosed particles, ELC18-100, after addition of materials.

These results show that retention may be higher, as confirmed by weighing and visually (FIG. 10, bottom).

TABLE 5

Effect from additional materials

| Treatment | % Remaining |
|---|---|
| ELC18-100A | 44.8 |
| ELC18-100B | 44.2 |
| ELC18-100 rpt | 42.6 |
| ELC18-100C | 43.0 |
| ELC18-100D | 42.2 |
| ELC18-100E | 42.8 |
| ELC18-100F | 47.8 |

Example 4—ELC18-157

Figure 11:
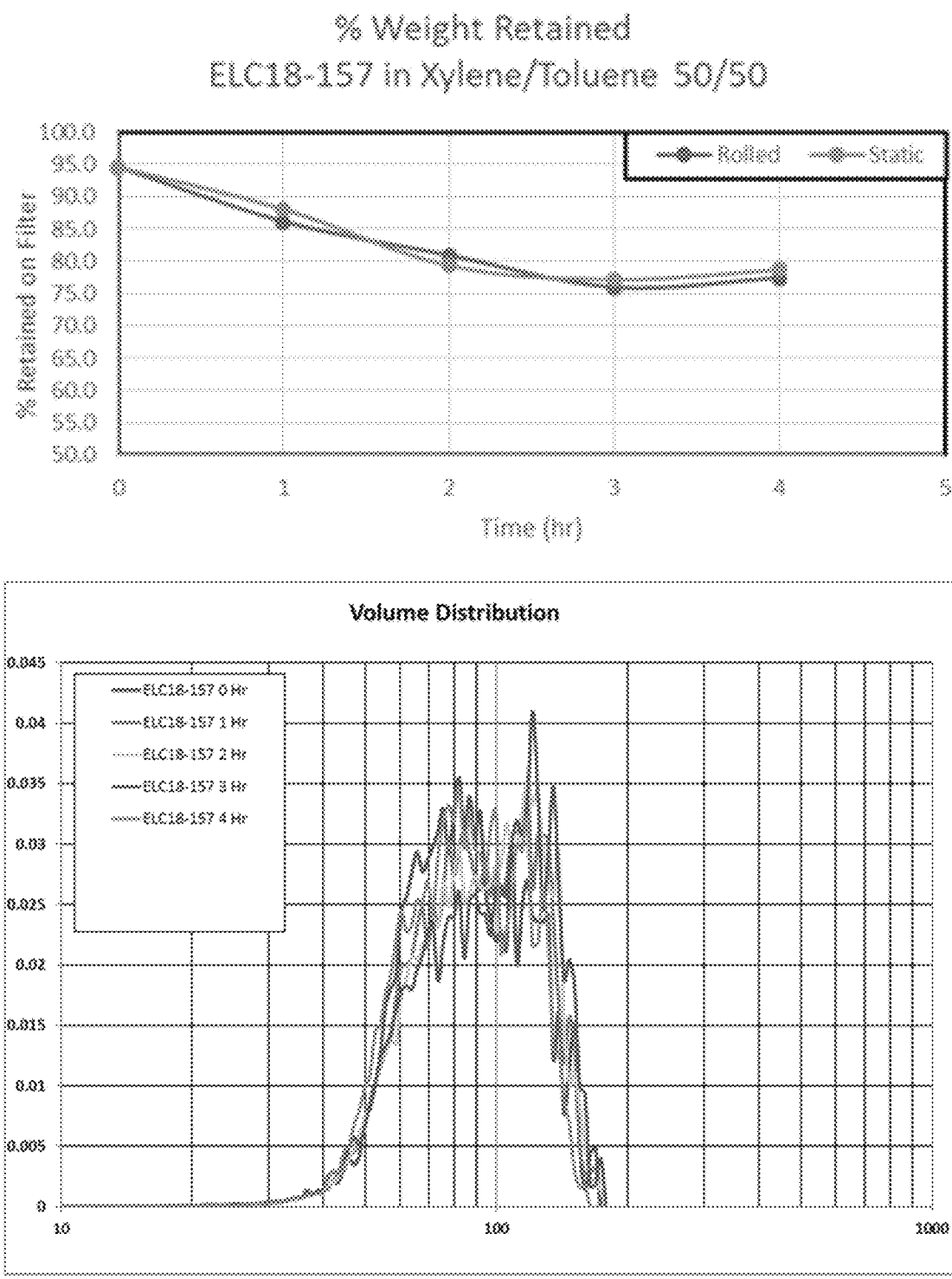
FIG. 11 is a graph of weight retention from 0-4 hours in xylene+toluene for one embodiment of the disclosed particles, ELC18-157 (top) and a size volume distribution (frequency vs. microns) of the 0 hr, 1 hr, 2 hr, 3 hr, and 4 hr ELC18-157 samples (bottom).
Figure 12:
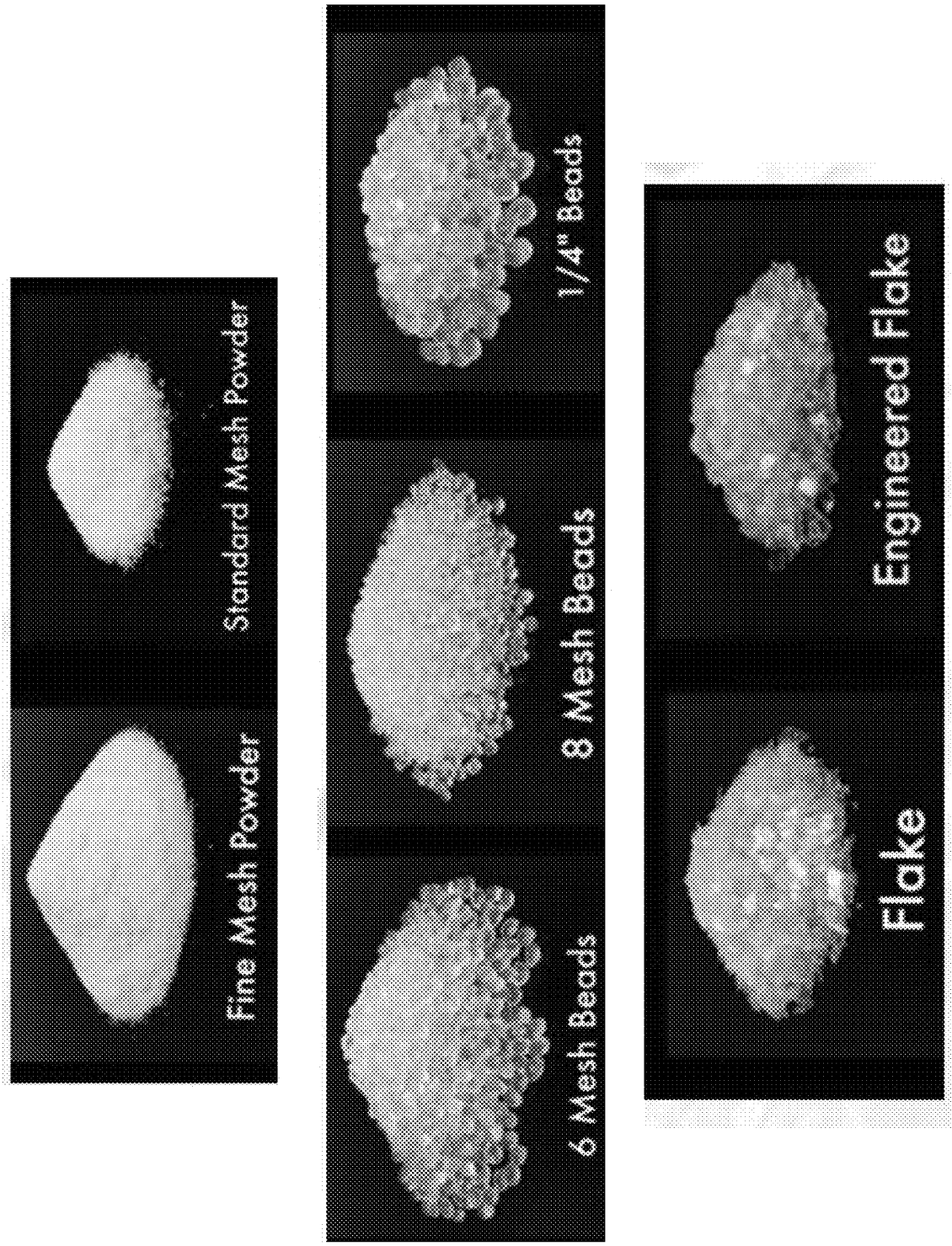
FIG. 12 shows several forms of the disclosed particles.
Figure 13:
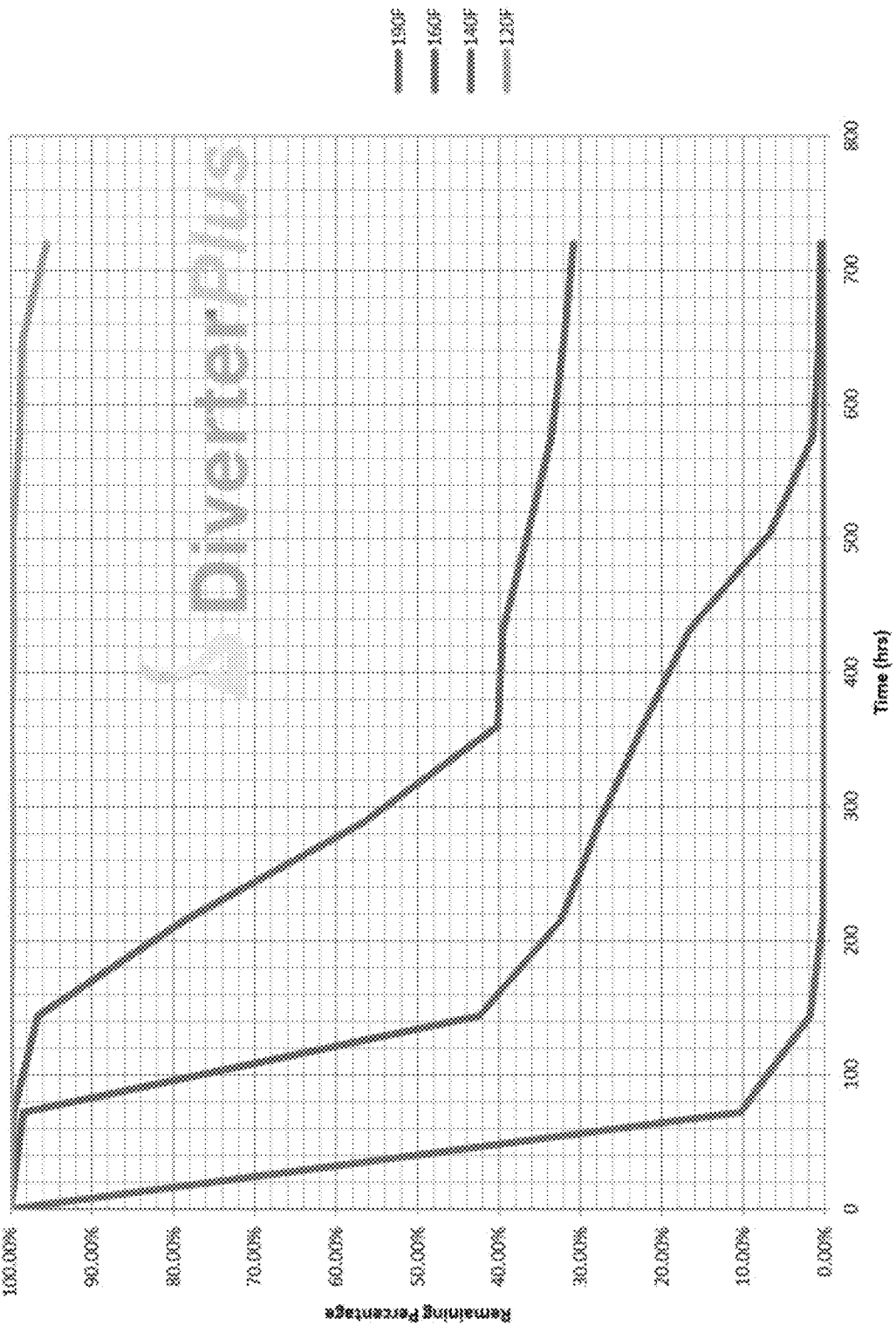
FIG. 13 shows graph of degradation of one embodiment of the disclosed particle over about 750 hr (~30 days) at 120° F., 140° F., 160° F., and 190° F.
Figure 14:
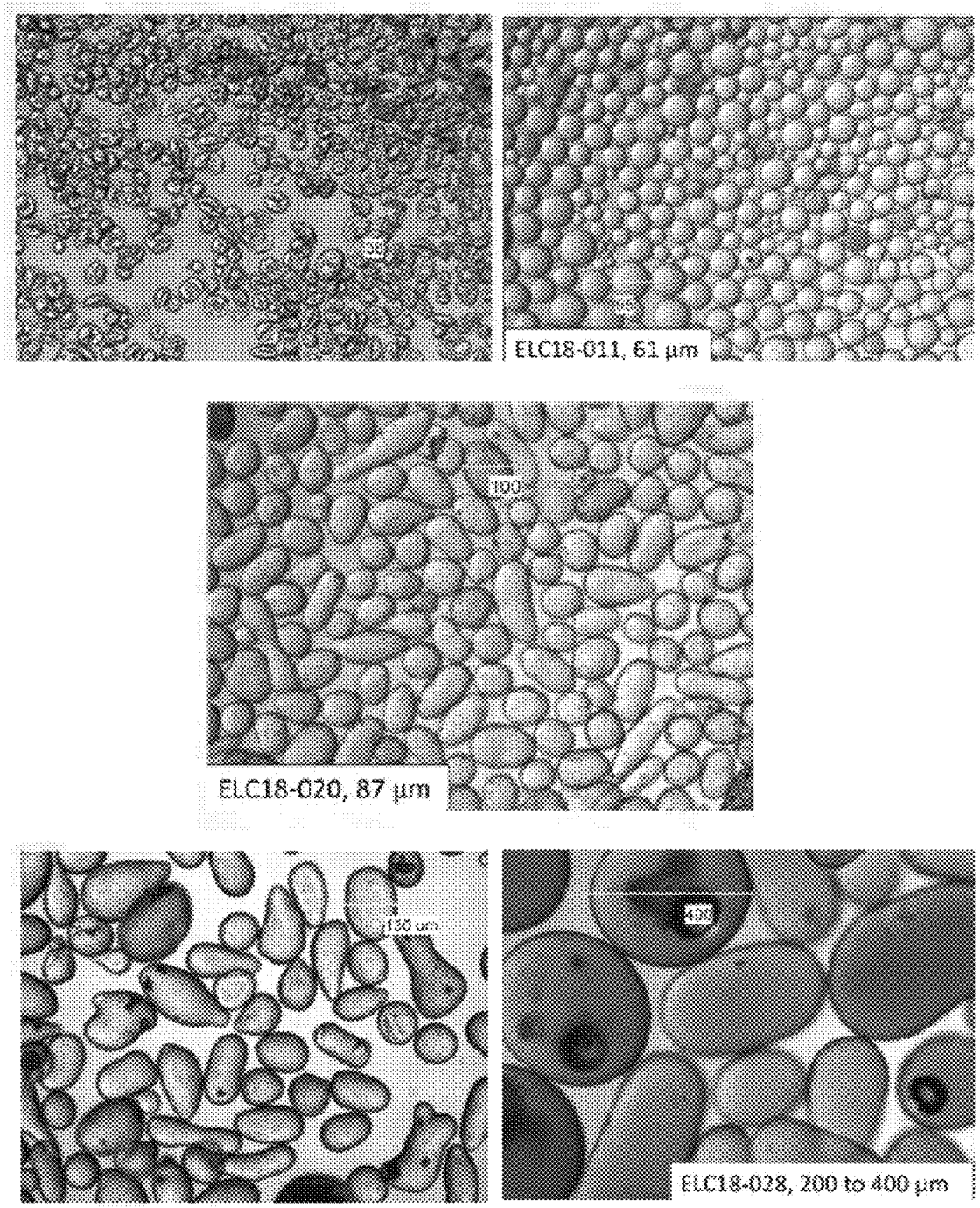
FIG. 14 are micrographs of several embodiments of the disclosed particles with various shapes and sizes (diameters of sample particles are shown in yellow, as well as size in microns).
Figure 15:
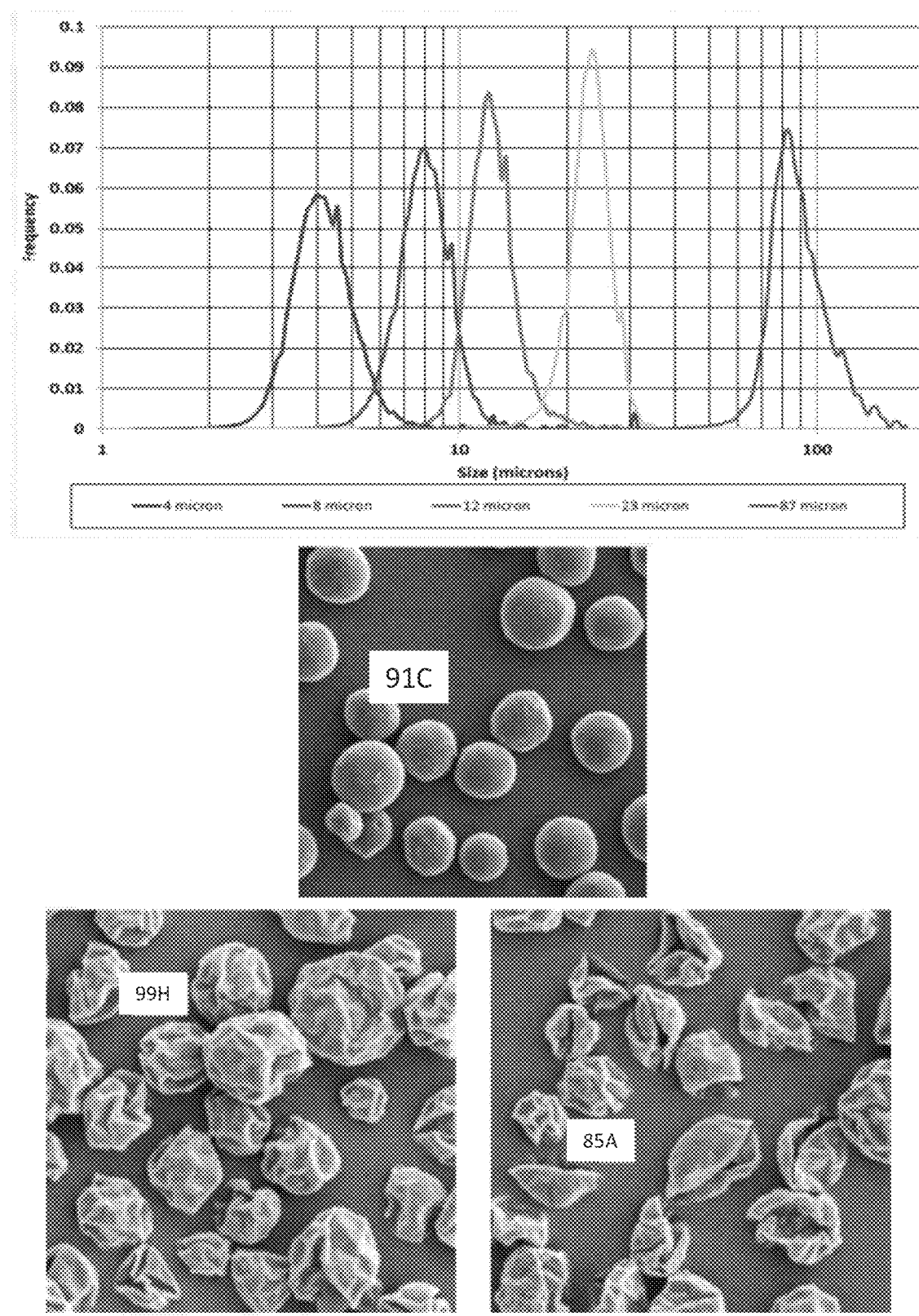
FIG. 15 shows size distribution for selected sizes (4 μm, 8 μm, 12 μm, 23 μm, and 87 μm) of various embodiments of the disclosed particles.

16 g of xylene and toluene (50/50) was added to a glass scintillation vial. 0.4 g of one embodiment of the disclosed particles were added to same vial. Vials were then sealed and agitated by hand. Some sample vials were placed on roller at 25 rpm, while some samples were placed on their sides and not rolled after agitation Zero hr samples were removed and filtered immediately after agitation. Filtration was performed in a small buchner funnel with Grade 2 qualitative filter paper (Whatman) and pulled with a vacuum. The filter paper was then removed and placed in aluminum pan, and any residue in the funnel was also transferred to the pan for drying overnight at 50° C. Table 6 shows results from these tests. A graph of this weight retention data is shown at FIG. 11 (top).

TABLE 6 samples testing of ELC18-157 for retained amounts at 0-4 hrs static or rolling in xylene + toluene solvent.

| Sample | Time (hr) | % Retained Rolled | % Retained Static |
|---|---|---|---|
| ELC18-157 | 0 | 94.5 | 94.5 |
| ELC18-157 | 1 | 86.1 | 88.0 |
| ELC18-157 | 2 | 80.9 | 79.4 |
| ELC18-157 | 3 | 75.9 | 77.2 |
| ELC18-157 | 4 | 77.4 | 78.7 |

Dried particles were transferred to scintillation vials for rehydration in water+surfactant (Triton X100). Vials were then transferred to a sonication bath. Particles from sonicated solutions were measured (Coulter) by counter using a 280 micron aperture. Results for rolled samples are shown at Table 7, below. FIG. 11 (bottom) shows a graph of these results.

TABLE 7 size distribution for rehydrated ELC18-157 particles.

| Sample | Size (microns) | | | | | |
| | Dn10 | Dn50 | Dn90 | Dv10 | Dv50 | Dv90 |
|---|---|---|---|---|---|---|
| ELC18-157 0 Hr | 6.4 | 48.0 | 84.9 | 57.5 | 84.7 | 129.9 |
| ELC18-157 1 Hr | 6.1 | 38.6 | 86.2 | 58.1 | 90.8 | 132.8 |
| ELC18-157 2 Hr | 6.2 | 36.1 | 87.0 | 58.0 | 93.3 | 134.7 |
| ELC18-157 3 Hr | 6.2 | 37.8 | 87.0 | 57.3 | 95.8 | 138.5 |
| ELC18-157 4 Hr | 6.5 | 48.9 | 85.2 | 55.3 | 84.2 | 126.6 |

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed description is to be regarded as illustrative in nature and not restrictive.

All references disclosed herein, whether patent or non-patent, are hereby incorporated by reference as if each was included at its citation, in its entirety. In case of conflict between reference and specification, the present specification, including definitions, will control.

Although the present disclosure has been described with a certain degree of particularity, it is understood the disclosure has been made by way of example, and changes in detail or structure may be made without departing from the spirit of the disclosure as defined in the appended claims.

We claim:

1. A composition for temporarily blocking fluid flow between conductivity zones comprising:
   a plurality of particles having at least one measurable dimension between 2 and 1,000 μm, wherein the particle comprises a core and a protective coating material surrounding the core, wherein the core comprises a polymer selected from polycaprolactone (PCL), poly(lactic-co-glycolic acid) (PLGA), and poly-lactic acid (PLA), and pores that reduce the particles' density, and the coating material comprises silica; and
   a solvent comprising one or more of toluene, xylene, hexane, and benzene.

2. The composition of claim 1, wherein the coating material surrounding the core is colloidal silica oxide.

3. The composition of claim 1, wherein the core is poly-lactic acid.

4. The composition of claim 3, wherein the particle is round or oblong, the coating is between 0.1% and 3% w/w of the entire weight of the particle, and the solvent comprises one or more of xylene and toluene.

5. Method of traversing a sand control completion or SCC comprising:
   passing a solvent through the SCC, wherein the solvent is selected from one or more of toluene, xylene, hexane, and benzene;
   passing a polymeric particle, comprising a core of poly-lactic acid with pores to reduce its density to within ±20% of the solvent's density, and a coating comprising silica, wherein the polymeric particle has at least one measurable dimension between 2 and 1,000 μm, through the SCC, wherein the particle traverses the SCC.

6. The method of claim 5, where in the SCC is selected from a gravel pack or sand screen.

7. The method of claim 6, wherein the gravel pack comprises particles of between 2 and 100 mesh.

8. The method of claim 7, wherein the particles are between 20 and 40 mesh.

9. The method of claim 7, wherein the particles are between 8 and 16 mesh.

10. The method of claim 7, wherein the particles are between 40 and 70 mesh.

11. The method of claim 7, wherein the polymeric particle has a Young's modulus of less than about 500,000 psi.

12. The method of claim 5, wherein the solvent and the particle are mixed.

13. The method of claim 5, wherein the solvent is added before the particle.

14. The method of claim 5, wherein a second solvent is passed through the SCC.

15. The method of claim 5, comprising a step of monitoring the pressure and identifying a drop in pressure after addition of the solvent.

16. The method of claim 5, wherein the first two steps are repeated.

* * * * *